F. V. MEDYNSKI.
VEHICLE WHEEL.
APPLICATION FILED MAY 26, 1917.
1,316,377. Patented Sept. 16, 1919.
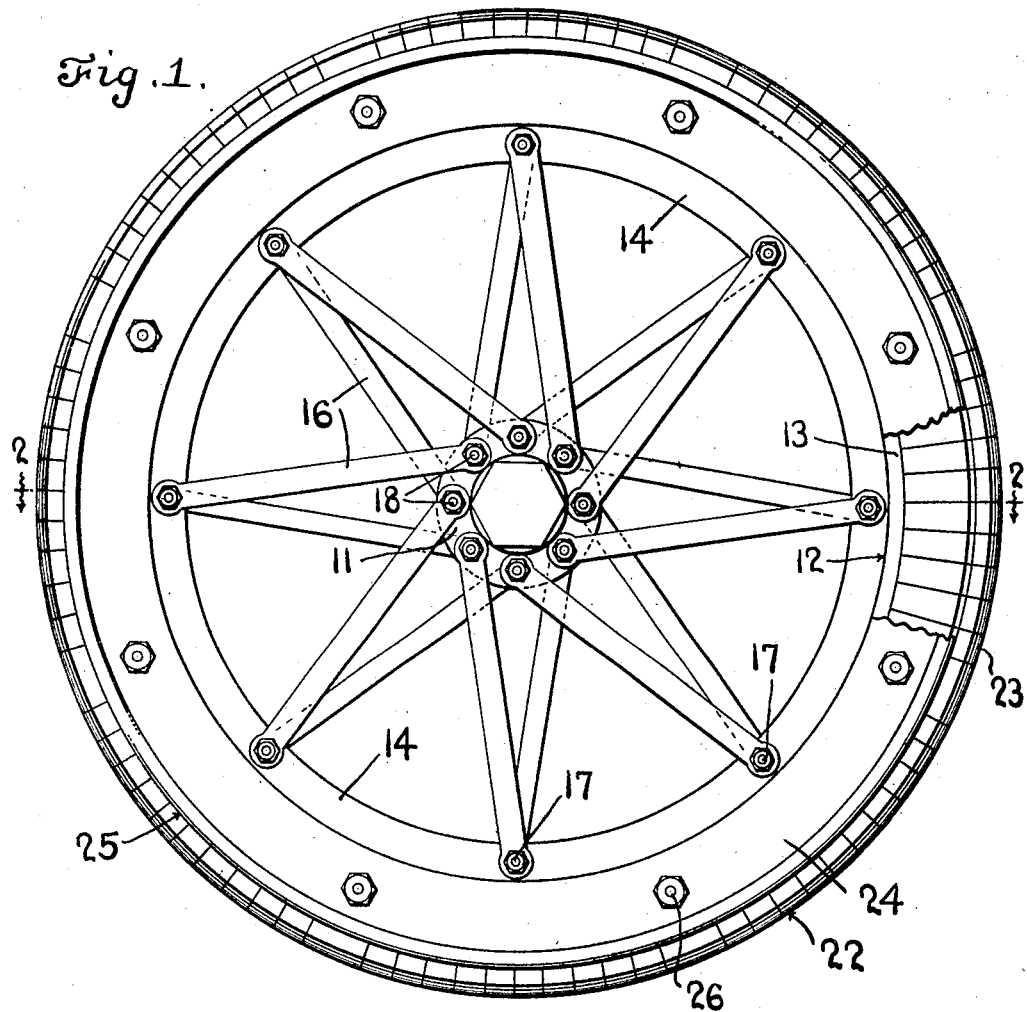
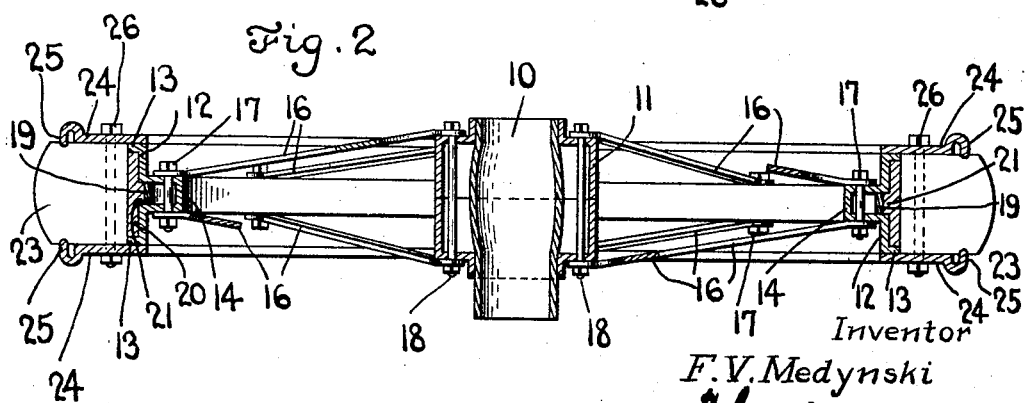
Inventor
F. V. Medynski
By [signature],
Attorneys

UNITED STATES PATENT OFFICE.

FRED V. MEDYNSKI, OF MEDFORD, OREGON.

VEHICLE-WHEEL.

1,316,377.  Specification of Letters Patent.  Patented Sept. 16, 1919.

Application filed May 26, 1917. Serial No. 171,199.

*To all whom it may concern:*

Be it known that I, FRED V. MEDYNSKI, a citizen of the United States, residing at Medford, in the county of Jackson and State of Oregon, have invented certain new and useful Improvements in Vehicle-Wheels, of which the following is a specification.

This invention relates to an improved vehicle wheel especially designed for use upon automobiles and has as its primary object to provide a construction wherein the commonly employed pneumatic tire will be eliminated.

The invention has as a further object to provide a wheel employing a plurality of rigid tread blocks for withstanding the wear of the road surface and wherein said blocks will rest upon a resilient shock deadening ring.

And the invention has as a still further object to provide an improved mounting for the tread blocks of the wheel as well as an improved arrangement of spokes for supporting the wheel rim.

Other and incidental objects will appear as the description proceeds and in the drawings wherein I have illustrated the preferred embodiment of the invention and wherein similar reference characters designate corresponding parts throughout the several views:

Figure 1 is a side elevation of my improved wheel, this view being partly broken away to show the tapered tread blocks employed, and Fig. 2 is a transverse sectional view taken on the line 2—2 of Fig. 1, and particularly showing the mounting of the spokes of the wheel as well as the mounting of the tread blocks.

In carrying out the invention I employ a wheel hub 10 around which is tightly fitted a sectional channeled sleeve 11 providing a spoke ring, this ring being preferably pressed out from suitable sheet metal. Surrounding the hub is a rim 12 provided with annular side flanges 13. This rim is also preferably formed from suitable sheet metal and is pressed out to form a medially arranged annular channel 14 projecting inwardly with respect to the rim. Extending between the rim and hub is a plurality of spokes 16. These spokes are preferably formed of metal and are arranged in pairs. The outer ends of each pair of spokes are connected to opposite sides of the channel 14 of the rim by a bolt or other suitable fastening device 17 extending through the said channel while the inner ends of the said pairs of spokes respectively are connected in staggered relation to opposite ends of the spoke ring 11 by bolts or other suitable fastening devices 18 extending through the said spoke ring. The spokes of each pair thus diverge from the bolts 17 at the rim to the bolts 18 upon the hub and as will be seen, the bolts 18 also act to adjustably connect the sections of the spoke ring.

Freely fitted within the channel 14 of the rim 12 is an annular spreader ring 19 of a radius slightly less than that of the rim and supporting the side walls of the said channel with respect to each other. Seated within the rim between the side flanges 13 thereof is a resilient shock deadening element 20 arranged to overlie the channel 14 and formed upon its inner side with an annular rib 21 projecting into the said channel and engaging with the ring 19 for retaining the ring in position. The element 20 is preferably formed of rubber or other similar resilient material.

Encircling the rim is an annular tread 22 formed of a plurality of tapered tread blocks 23. These blocks may be constructed of wood or other suitable material to resist the wear of the road surface and at their inner extremities overhang the side flanges 13 of the rim to seat upon the shock deadening element 20. Overlying opposite corresponding edges of the tread blocks are annular side plates 24 therefor seating at their inner margins against the outer faces of the side flanges 13 of the rim. At their outer margins the plates 24 are rolled to provide annular flanges 25 bearing into the side edges of the tread blocks 23 and connecting the said plates is a plurality of circumferentially spaced bolts or other suitable fastening devices 26 extending through the tread. In this connection, it will be observed that the tread blocks receiving the bolts 26 are preferably thicker than the other tread blocks employed, this being for the purpose, of course, of preventing the fracture of the said blocks. By tightening the bolts 26, the flanges 25 of the side plates will be caused to effectually grip the tread blocks for securely holding the said blocks in position.

It will therefore be seen that I provide a particularly effective construction for the purpose set forth and a wheel adapted for general use upon motor vehicles. Shocks or jars upon the tread 22 of the wheel will be communicated to the resilient element 20 to be deadened thereby while, after short usage, the blocks of the tread will become broomed to also tend to deaden the shocks against the tread.

Having thus described the invention, what is claimed as new is:

A vehicle wheel including a hub, a channeled rim surrounding the hub, spokes supporting the rim with respect to the hub, a spreader ring received within the channel of the rim and supporting the side walls of the said channel with respect to each other, a shock deadening element overlying said channel and formed with an annular rib projecting within the channel to engage said ring for retaining the ring in position and bracing the said element against transverse displacement from the rim, and a tread mounted upon the rim to contact with said element.

In testimony whereof I affix my signature.

FRED V. MEDYNSKI. [L. S.]

Copies of this patent may be obtained for five cents each, by addressing the "Commissioner of Patents, Washington, D. C."